(12) United States Patent
Mina et al.

(10) Patent No.: US 8,640,076 B2
(45) Date of Patent: Jan. 28, 2014

(54) METHODOLOGY ON DEVELOPING METAL FILL AS LIBRARY DEVICE AND DESIGN STRUCTURE

(75) Inventors: Essam Mina, South Burlington, VT (US); Guoan Wang, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 155 days.

(21) Appl. No.: 12/906,707

(22) Filed: Oct. 18, 2010

(65) Prior Publication Data

US 2012/0096419 A1    Apr. 19, 2012

(51) Int. Cl.
  *G06F 17/50* (2006.01)
(52) U.S. Cl.
  USPC ............................ 716/136; 716/100
(58) Field of Classification Search
  USPC ........................ 716/100–104, 136
  See application file for complete search history.

(56) References Cited

U.S. PATENT DOCUMENTS

| | | | |
|---|---|---|---|
| 6,185,722 B1 | 2/2001 | Darden et al. | |
| 6,865,727 B2 | 3/2005 | Frerichs et al. | |
| 7,016,820 B2 | 3/2006 | Kimura et al. | |
| 7,356,783 B2 * | 4/2008 | Smith et al. | 716/54 |
| 7,373,620 B1 | 5/2008 | Lenahan | |
| 7,380,220 B2 * | 5/2008 | Smith et al. | 716/111 |
| 7,448,014 B2 * | 11/2008 | Lavin et al. | 716/106 |
| 2003/0229875 A1 * | 12/2003 | Smith et al. | 716/10 |
| 2004/0049754 A1 * | 3/2004 | Liao et al. | 716/8 |
| 2007/0220459 A1 | 9/2007 | Gurney | |
| 2008/0133201 A1 | 6/2008 | Guedon | |
| 2011/0161908 A1 | 6/2011 | Elfadel et al. | |

OTHER PUBLICATIONS

Chen et al., "Area Fill Synthesis . . . Density", IEEE Trans. on Computer-Aided Design of Integrated Circuits and Systems, Oct. 2002, vol. 21, No. 10, pp. 1132-1147.
Stine et al. "The Physical and Electronic Effects . . . Polishing Processes", IEEE Transactions on Electron Devices, Mar. 1998, vol. 45, No. 3, pp. 665-679.
N. P. van der Meijs et al., "An efficient finite element . . . extraction," Proceedings of the 26th ACM/IEEE Design Automation Conference, 1989, pp. 678-681.
Yamaguchi et al., "Capacitance analysis of devices with electrically floating regions", Solid-State Electronics, vol. 48, Issue 12, Dec. 2004, pp. 2115-2124.

* cited by examiner

*Primary Examiner* — Binh Tat
(74) *Attorney, Agent, or Firm* — Anthony Canale; Roberts Mlotkowski Safran & Cole, P.C.

(57) ABSTRACT

A methodology is provided on developing metal fill as a library device and, in particular, a method of generating a model of the effects (e.g., capacitance) of metal fills in an integrated circuit and a design structure. The method is implemented on a computing device and includes generating a model for effects of metal fill in an integrated circuit. The metal fill model is generated prior to completion of a layout design for the integrated circuit.

15 Claims, 5 Drawing Sheets

- Number of columns
- Number of fills in one column

METHODOLOGY ON DEVELOPING METAL FILL AS LIBRARY DEVICE AND DESIGN STRUCTURE

FIELD OF THE INVENTION

The invention relates to a methodology on developing metal fill as a library device and, in particular, to a method of generating a model of the effects (e.g., capacitance) of metal fills in an integrated circuit and a design structure.

BACKGROUND

In integrated circuits, chemical mechanical polishing (CMP) has been used to planarize interlayer dielectrics; however, CMP processes are sensitive to layout patterns, and this can cause certain regions on chip to have thicker dielectric layers than other regions due to differences in the underlying topography.

Metal fill usage is a common process requirement for manufacturing in integrated circuits. Metal fill has been found to be one of the most commercially viable options in reducing layout dependent dielectric thickness variation. Also, metal fill is used to meet design rules, which are required by foundries for processing of the integrated circuit. For example, physical design tools insert dummy metal patterns, e.g., metal fill, so that designs meet the required metal density as specified by foundries to reduce the thickness variation. More specifically, metal-fill patterning is the process of filling large open areas on each metal layer with a floating metal pattern to compensate for pattern-driven variations.

However, metal fill adds parasitic capacitance to the integrated circuit with more than 10% capacitance increase for a single interconnect. This is due to the fact that the metal fills effectively decrease the spacing between features. Due to the increase in capacitance, the designer may need to redesign the integrated circuit to compensate for the parasitic capacitance. This design process is an iterative process of (i) circuit schematic design, (ii) add metal fill in the layout, (iii) determine effect of metal fill on the circuit, (iv) adjust metal fill and circuit schematic design, (v) determine effect on circuit, etc, which is time consuming and expensive.

Foundries use automatic metal fill algorithms to insert dummy fills (metal fills) in the design where metal is sparsely distributed. However, these fill algorithms do not take into consideration the design parameters, e.g., functionality of the integrated circuit, when providing the dummy fills. And, physical verification tools can be effectively used in inserting such dummy metal fills based on certain criteria. Parasitic extraction tools, though, can be used to evaluate the effect of the metal fill. However, parasitic extraction can only be performed after layout, which is the last step in the circuit design flow. As the parasitic extraction can only be performed after layout, the designer will have to redesign the integrated circuit to compensate for the parasitic capacitance, at a very late stage in the circuit flow design. This means that the designer, after the expenditure of considerable time and expense, will have to start the design process at the beginning of the circuit flow design and then reevaluate the metal fill effects on the new design.

Accordingly, there exists a need in the art to overcome the deficiencies and limitations described hereinabove.

SUMMARY

In a first aspect of the invention, a method implemented on a computing device comprises generating a model for effects of metal fill in an integrated circuit. The metal fill model is generated prior to completion of a layout design for the integrated circuit.

In another aspect of the invention, a method implemented on a computing device comprises obtaining parameters of an integrated circuit and generating a p-cell from the parameters. The method further comprises providing model effects of the metal fill in the integrated circuit by using hierarchical compact model calls to component metal fills based on the generated placement of the metal fill obtained in the p-cell. The method further comprises performing a Monte Carlo enabled process to determine different effects based on process variations of the integrated circuit.

In another aspect of the invention, a design structure tangibly embodied in a machine readable storage medium for designing, manufacturing, or testing an integrated circuit is provided. The design structure comprises the structures of the present invention. In further embodiments, a hardware description language (HDL) design structure encoded on a machine-readable data storage medium comprises elements that when processed in a computer-aided design system generates a machine-executable representation of the metal fill shapes and model, which comprises the structures of the present invention. In still further embodiments, a method in a computer-aided design system is provided for generating a functional design model of the metal fill shapes. The method comprises generating a functional representation of the structural elements of the metal fill shapes and model.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

The invention relates to a methodology on developing metal fill as a library device and, in particular, to a method of generating a model of the effects (e.g., capacitance) of metal fills in an integrated circuit and a design structure. In embodiments, the metal fill model generated by the present invention (e.g., simulation tool) can be generated prior to completion of a layout design for the integrated circuit. This provides a circuit designer with an accurate assessment of the effect of metal fill, e.g., parasitic capacitance, on a circuit design at an early stage in the design process (compared to conventional methods). In this way, the present invention eliminates the need for an iterative design process of (i) circuit schematic design, (ii) add metal fill, (iii) determine effect of metal fill on the circuit, (iv) adjust metal fill and circuit design, (v) determine effect on circuit, etc. Instead, it is now possible to generate a metal fill model which takes into account metal fill shape effects during the circuit design, saving considerable time and expense.

In embodiments, the present invention (e.g., simulation tool and related processes) provides a methodology to create a library device and modeling for metal fill, as a pre-layout device. For example, in implementation, the metal fill is simulated with capacitance and resistance network, which can be generated with an electromagnetic (EM) solver. As should be understood by those of skill in the art, EM solvers are specialized programs that form a part of the field of electronic design automation (EDA), and are commonly used in the design of integrated circuits. The metal fill model can be created as a device with p-cell and design rule check (DRC) clean (i.e., a design check will not be necessary as there should be no errors), and can be migrated into different technologies.

Figure 1:
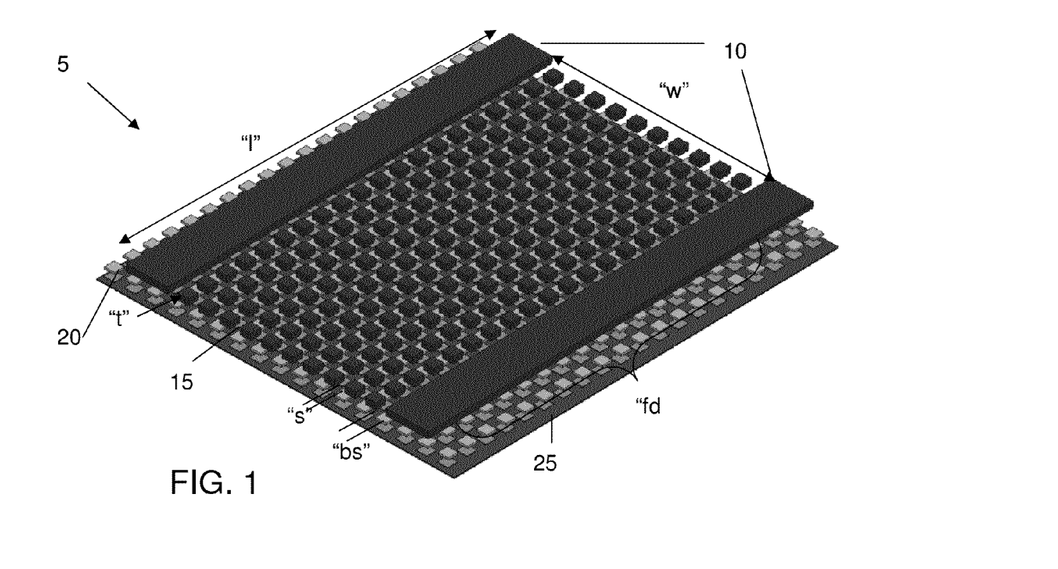
FIG. 1 shows a structure and representative model for metal fill generated in accordance with aspects of the present invention.

FIG. 1 shows a structure in accordance with aspects of the present invention. The structure of FIG. 1 can be representative of a model for metal fill generated in accordance with aspects of the present invention. FIG. 1 also provides a general discussion of metal fill layouts and related parameters used for generating the model in accordance with aspects of the present invention.

More specifically, the structure 5 of FIG. 1 includes metal lines 10 such as, for example, power transmission lines or signal lines separated by a certain distance or width, "w". In embodiments, the power transmission lines or signal lines 10 can be, for example, metal lines, having a certain length "l". A plurality of metal fills 15 are floating between the power transmission lines or signal lines 10. In embodiments, the metal fills 15 are spaced apart from one another by a distance "s". A space "bs" is provided between the power transmission lines or signal lines 10 to an adjacent row of the metal fills 15. The metal fills 15 can also have a certain thickness "t", such as a standard thickness. An additional model parameter may include the percentage of open areas to be filled by the metal fills 15, e.g., fill density, represented as "fd". The fill density "fd" may be considered a design rule provided by a foundry. The structure 5 of FIG. 1 also includes an underlying metal layer 20, which may also be representative of an underlying metal fill layer, and a ground layer 25.

Taking into consideration the above noted applicable parameters, the present invention (e.g., simulation tool and/or processes) will generate a model showing the location and, in some implementations, the size and shape of the metal fill shapes. The present invention (e.g., simulation tool and/or processes) can also generate the effects that these metal fill shapes will have on the overall circuit, e.g., parasitic capacitance, to allow the designer to compensate for such effects prior to the complete layout of the design. In addition, the model of the present invention can be generated taking into account the design rules associated with the fabrication processes of the integrated circuit. For example, the present invention (e.g., simulation tool) can take into account the metal fill density rules needed to fabricate the integrated circuit in accordance with qualified processing rules, e.g., 40% metal fill density to reduce layout dependent dielectric thickness variation.

Figure 2:
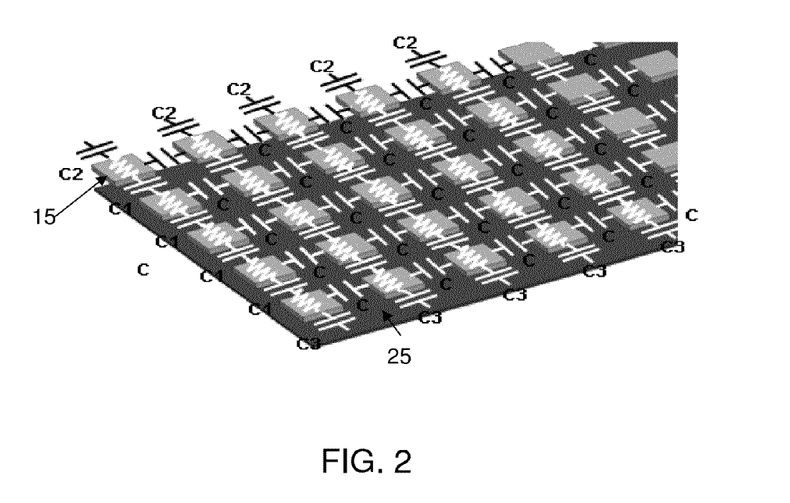
FIG. 2 shows a representative model with an electrical network overlay of a metal fill, in accordance with an aspect of the present invention.

FIG. 2 shows a representative model with an electrical network overlay of a metal fill, in accordance with an aspect of the present invention. More specifically, in FIG. 2, each of the metal fill shapes 15 includes a certain resistance, R, dependent on the size and shape of the metal fill shape. The space between each of the metal fill shapes 15 has a certain capacitance, C, dependent on the distance therebetween. The structure also has a certain capacitance C1 between the metal fill shapes 15 and the underlying layer, e.g., ground plane 25. Also, capacitance C2, C3 are shown between an adjacent row of the metal fill shapes and the respective power transmission or signal line (not shown).

Figure 3:
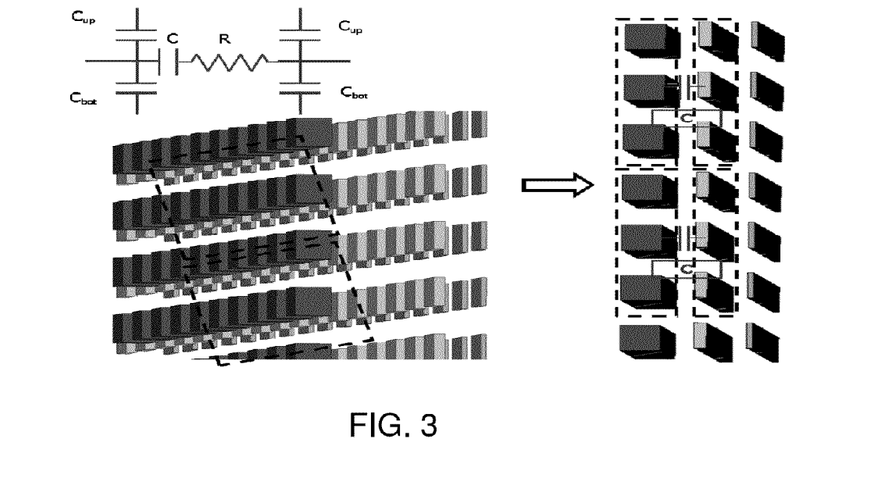
FIG. 3 shows an equivalent circuit layout of an illustrative metal fill structure generated in accordance with aspects of the present invention.

FIG. 3 shows an equivalent circuit layout of an illustrative metal fill structure generated in accordance with aspect of the present invention. More specifically, the metal fill is simulated as a capacitance and resistance network, which can be generated with an electromagnetic (EM) solver using the simulation tool and/or processes of the present invention. By generating the capacitance and resistance network of a metal fill structure in a pre-layout design, it is now possible to determine a parasitic capacitance for the circuit to enable the designers with a realistic estimate of the parasitic capacitance caused by metal fill insertion. This pre-layout model for metal fill, in turn, can be used to evaluate the effect of the metal fill on performance of the integrated circuit. This methodology to generate an on-chip model for metal fills can be implemented as a new library element, is scalable and can be built with p-cell. In addition, the model can be generated with automatically coding with current existing systems such as, for example, EMSURF (electromagnetic surface modeling) and Matlab (matrix laboratory).

Figure 4:
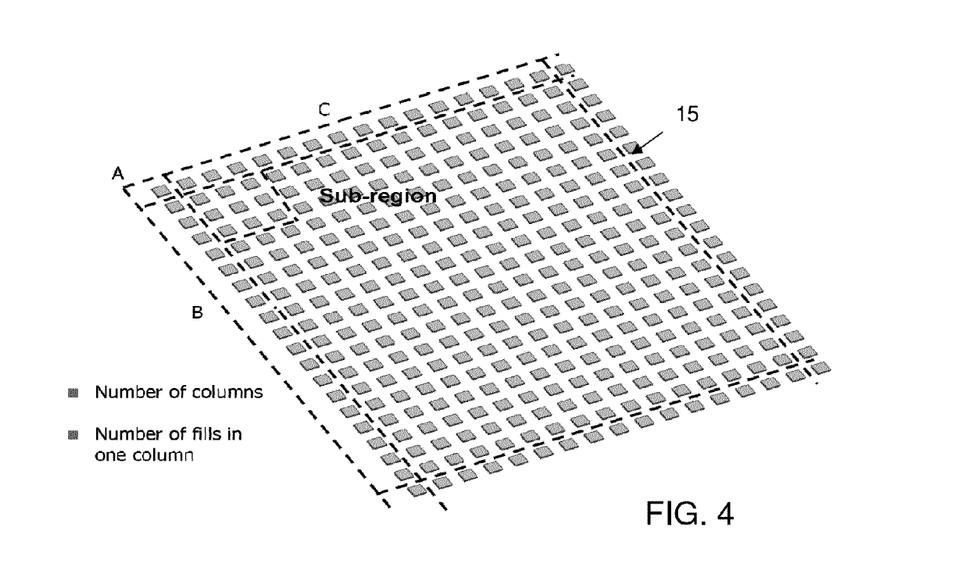
FIG. 4 shows a model generated with different sub-cells in accordance with aspects of the present invention.

FIG. 4 shows a model generated with different sub-cells in accordance with aspects of the present invention. More specifically, the present invention can generate models with metal fill shapes encompassing an entire fill space, or models using sub-cells with known capacitance to generate metal fills encompassing an entire fill space. The sub-cells can be extrapolated to the model of sub-cells into an entire fill space of metal fills with a certain density and known capacitance in a pre-layout design.

The present invention contemplates using different sub-cells including, for example, a corner having a multitude of metal fill shapes represented by reference "A", rows of metal fill shapes represented by reference "B" and/or columns of metal fill shapes represented by reference "C". In accordance with aspects of the invention any of these representative sub-sets can be modeled in a capacitance and resistance network, as shown in FIG. 3, to determine the effects of the sub-cells, e.g., the effective capacitance of the sub-cells. The model, e.g., the effective capacitance of the sub-cells, can then be extrapolated to encompass the entire open space, using e.g., the effective capacitance of the sub-cells, between adjacent power transmissions or signal lines to show the effects of the entire metal fill density.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
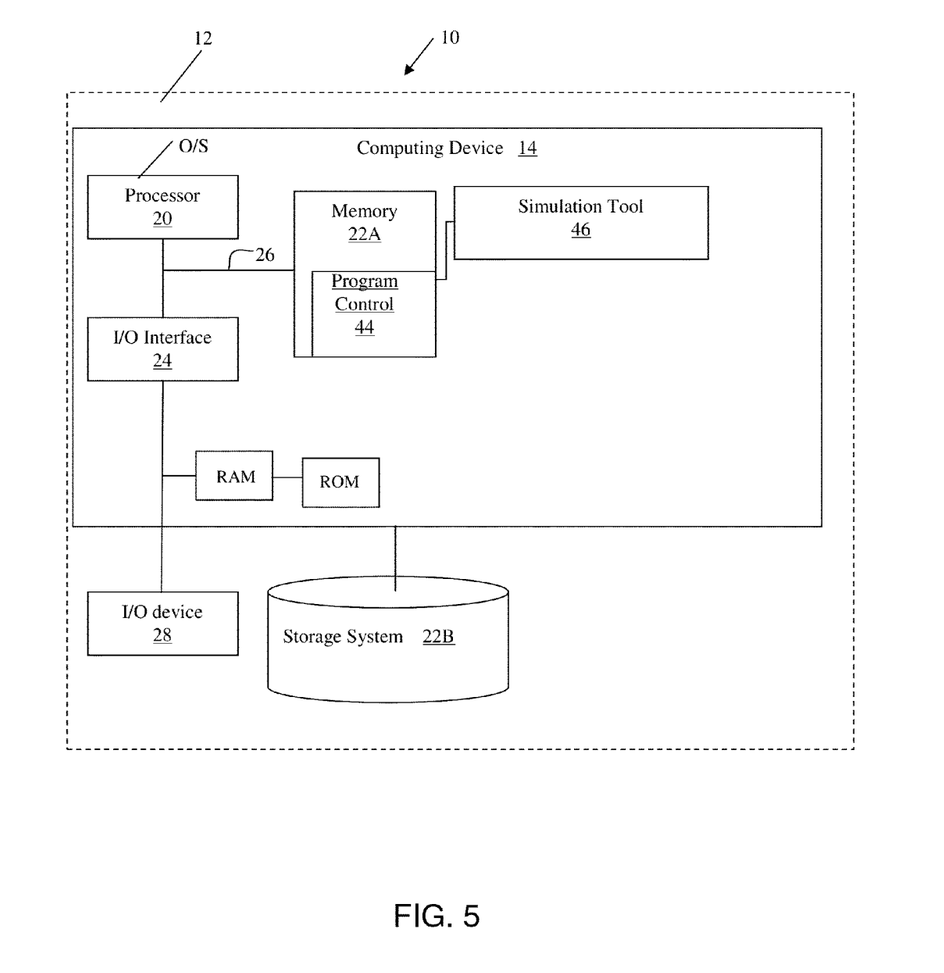
FIG. 5 shows an illustrative environment for managing the processes in accordance with the invention.

FIG. 5 shows an illustrative environment 10 for managing the processes in accordance with the invention. To this extent, the environment 10 includes a server or other computing system 12 that can perform the processes described herein. In particular, the server 12 includes a computing device 14. The computing device 14 can be resident on a network infrastructure or computing device of a third party service provider (any of which is generally represented in FIG. 5).

The computing device 14 includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S). The memory (e.g., 22A) may store simulation tools for execution by the processor 20.

The computing device 14 is in communication with the external I/O device/resource 28 and the storage system 22B. For example, the I/O device 28 can comprise any device that enables an individual to interact with the computing device 14 (e.g., user interface) or any device that enables the computing device 14 to communicate with one or more other computing devices using any type of communications link. The external I/O device/resource 28 may be for example, a handheld device, PDA, handset, keyboard etc.

In general, the processor 20 executes computer program code (e.g., program control 44), which can be stored in the memory 22A and/or storage system 22B. Moreover, in accordance with aspects of the invention, the program control 44 controls a simulation tool 46, e.g., which implements the processes described herein to generate models of the effects of metal fills. The simulation tool 46 can be implemented as one or more program code in the program control 44 stored in memory 22A as separate or combined modules. Additionally, the simulation tool 46 may be implemented as separate dedicated processors or a single or several processors to provide the function of these tools. While executing the computer program code, the processor 20 can read and/or write data to/from memory 22A, storage system 22B, and/or I/O interface 24. The program code executes the processes of the invention. The bus 26 provides a communications link between each of the components in the computing device 14.

Figure 6:
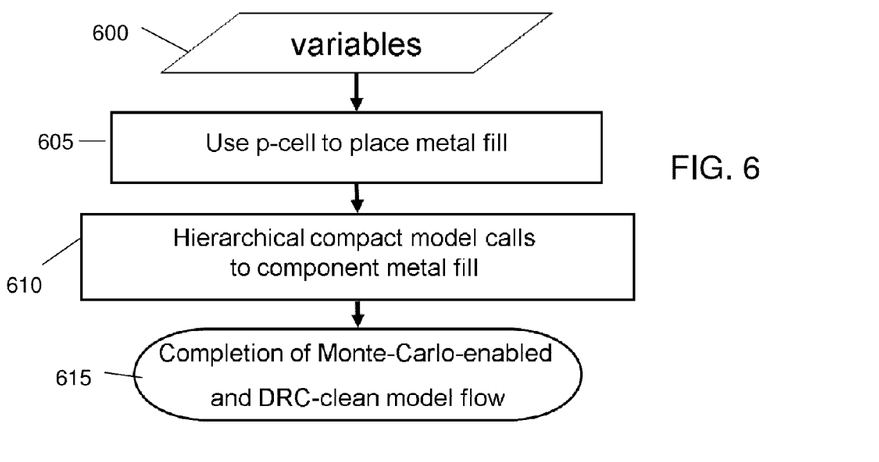
FIGS. 6 and 7 show exemplary flows for performing processes in accordance with aspects of the present invention.
Figure 7:
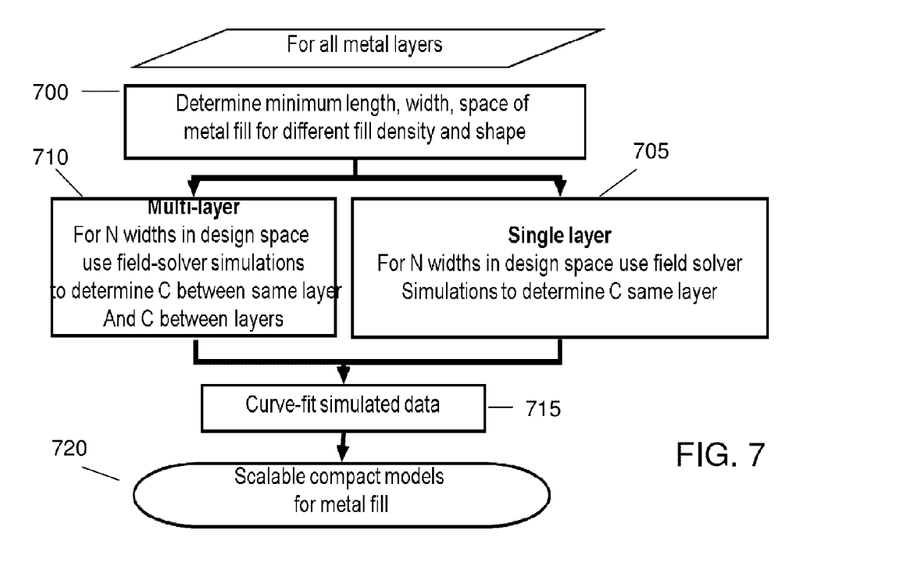

FIGS. 6 and 7 show exemplary flows for performing processes in accordance with aspects of the present invention. The steps of FIGS. 6 and 7 may be implemented in the environment of FIG. 5, for example. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. It is also noted that each block of the flowchart illustration and combinations flowchart illustration, can be implemented by special purpose hardware-based systems that perform the specified functions or acts, or combinations of special purpose hardware and computer instructions, as shown in FIG. 5.

In FIG. 6, at step 600, the process of the present invention, e.g., simulation tool, obtains applicable parameters needed to generate the model. These parameters can be, for example,
  (i) Width separating power transmission lines or signal lines, "w";
  (ii) Length of the power transmission lines or signal lines, "l";
  (iii) Spacing between the metal fill, "s";
  (iv) Spacing between metal fill and an adjacent power transmission or signal line, "bs";
  (v) Thickness of metal fill shapes, "t"; and/or
  (vi) Fill density, "fd".

In embodiments, the minimum width and spacing of metal fill can be used as parameters, "s" and "bs". Also, a standard thickness of the metal fill can be assumed for the thicknesses of the metal fill, "t". The parameters "w", "l" and "fd" can also be easily obtained from the design and foundry, for example.

At step 605, a p-cell is used to generate the placement of the metal fills, using the applicable parameters. The p-cell (parameterized cell) is a piece of programming code which is responsible for the process of creating the proper structure of the p-cell variants based on its (input) parameters. For example this code generates (draws) the actual shapes, e.g., metal fill shapes that comprise the circuit. In embodiments, the p-cell is automatically generated by electronic design automation (EDA) software based on the value of its governing parameters.

In this case, the p-cell represents the metal fills of the circuit that is dependent on one or more parameters noted above. For example, the p-cell definition represents the variously sized features in a given design, and different instances of a single p-cell can then represent metal fills of different sizes and locations, but otherwise similar characteristics. The metal fills can be stored as a library element. Accordingly, by using p-cells, a circuit designer can easily generate a large number of metal fill variations that only differ in a few parameters, thus increasing design productivity and consistency. Also, the designer, using p-cells, can change other circuit elements, in addition to or alternatively to metal fills, to meet the design rules.

At step 610, a hierarchical compact model calls to component metal fills. In this step, the model of the metal fills is obtained (generated) using, for example, a generated RC network. At step 615, the process, e.g., simulation tool, of the present invention performs (completes) a Monte Carlo enabled and DRC clean model. That is, the process, e.g., simulation tool, runs different models for different process variations to provide a metal fill pattern based on the process variations. This ensures that the model (e.g., placement of the metal fill shapes) will meet the design rules over different process variations. In this way, the, e.g., simulation tool, provides the designer with the pre-layout design taking into consideration the many different design parameters, process variations and design rules, i.e., provides the designer an accurate assessment of metal fill at the very early stage of design (pre-layout). The model and the library element can be easily migrated to different process technologies.

In FIG. 7, for all metal layers, at step 700, the process determines the minimum length, width, space of metal for different fill density and shape. The parameters are provided for the specified design rules, and can be obtained, e.g., using the p-cell at step 605 of FIG. 6 to create the model. At step 705, for a single layer metal fills, the process (e.g., simulation tool), determines the capacitance "C" for "N" widths between the power transmission or signal layers in design space. At step 710, for multiple layers metal fills, the process (e.g., simulation tool) determines the capacitance "C" between the same layer and between layers for "N" widths between the power transmission or signal layers in design space. Steps 705 and 710 can be obtained by the hierarchical compact model calls to component metal fills at step 610 of FIG. 6.

At step 715, curve fitted simulated data is obtained by the processes of the present invention, e.g., simulation tool. In this processing step, all of the data is curve fitted to obtain the relationship between, e.g., capacitance and the width between the power transmission lines or signal lines. This statistical data can be used in the future to obtain an equivalent circuit for other designs, design rules, etc. since the relationship between capacitance and the width between the power transmission lines or signal lines is known. For example, the processes, e.g., simulation tool, can extrapolate or interpolate capacitance values, e.g., known value of capacitance of metal fills for a known width, to obtain equivalent capacitances for different widths "w". In this way, the model can be scalable for other metal fills, at step 720.

A service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement.

Figure 8:
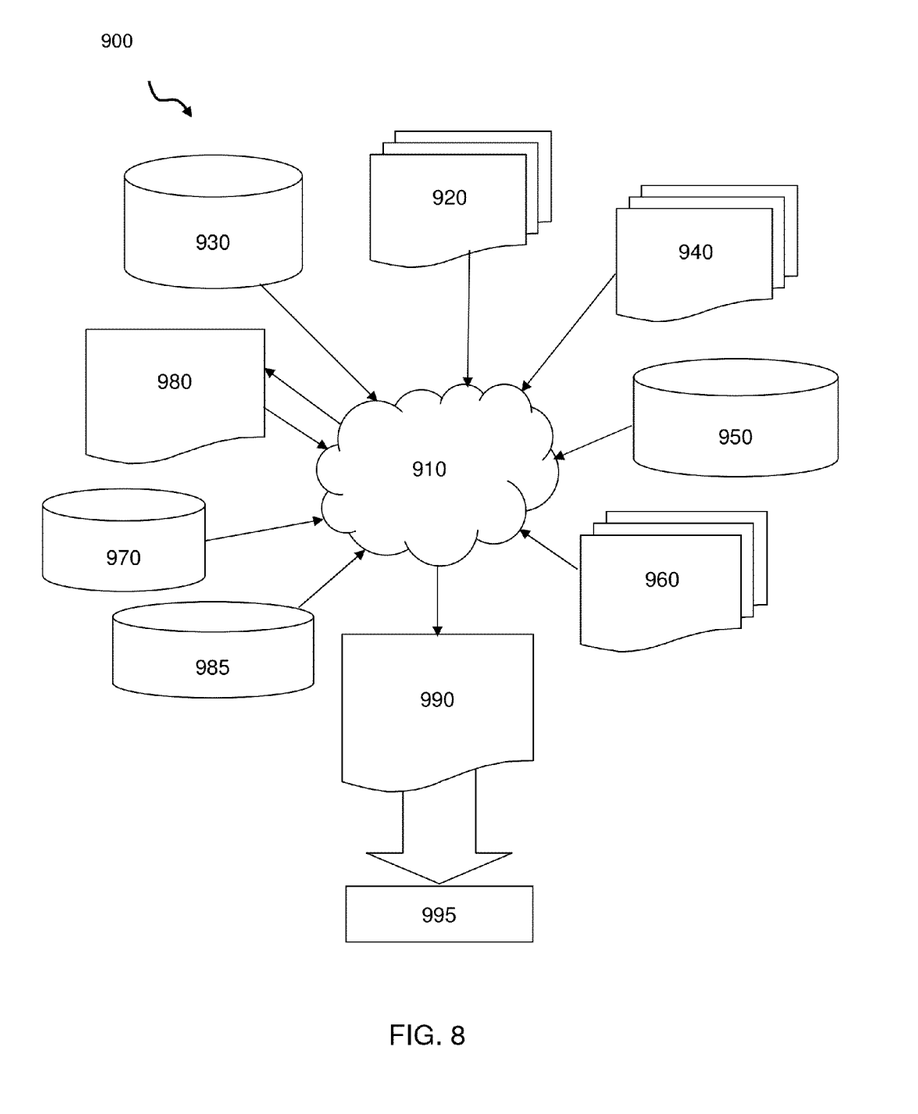
FIG. 8 is a flow diagram of a design process used in semiconductor design, manufacture, and/or test.

FIG. 8 is a flow diagram of a design process used in semiconductor design, manufacture, and/or test. FIG. 8 shows a block diagram of an exemplary design flow 900 used for example, in semiconductor IC logic design, simulation, test, layout, and manufacture. Design flow 900 includes processes, machines and/or mechanisms for processing design structures or devices to generate logically or otherwise functionally equivalent representations of the design structures and/or devices described above and shown in FIGS. 1-4. The design structures processed and/or generated by design flow 900 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 900 may vary depending on the type of representation being designed. For example, a design flow 900 for building an application specific IC (ASIC) may differ from a design flow 900 for designing a standard component or from a design flow 900 for instantiating the design into a programmable array, for example a programmable gate array (PGA) or a field programmable gate array (FPGA) offered by Altera® Inc. or Xilinx® Inc.

FIG. 8 illustrates multiple such design structures including an input design structure 920 that is preferably processed by a design process 910. Design structure 920 may be a logical simulation design structure generated and processed by design process 910 to produce a logically equivalent functional representation of a hardware device. Design structure 920 may also or alternatively comprise data and/or program instructions that when processed by design process 910, generate a functional representation of the physical structure of a hardware device. Whether representing functional and/or structural design features, design structure 920 may be generated using electronic computer-aided design (ECAD) such as implemented by a core developer/designer. When encoded on a machine-readable data transmission, gate array, or storage medium, design structure 920 may be accessed and processed by one or more hardware and/or software modules within design process 910 to simulate or otherwise functionally represent an electronic component, circuit, electronic or logic module, apparatus, device, or system such as those shown in FIGS. 1-4. As such, design structure 920 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 910 preferably employs and incorporates hardware and/or software modules for synthesizing, translating, or otherwise processing a design/simulation functional equivalent of the components, circuits, devices, or logic structures shown in FIGS. 1-4 to generate a netlist 980 which may contain design structures such as design structure 920. Netlist 980 may comprise, for example, compiled or otherwise processed data structures representing a list of wires, discrete components, logic gates, control circuits, I/O devices, models, etc. that describes the connections to other elements and circuits in an integrated circuit design. Netlist 980 may be synthesized using an iterative process in which netlist 980 is resynthesized one or more times depending on design specifications and parameters for the device. As with other design structure types described herein, netlist 980 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 910 may include hardware and software modules for processing a variety of input data structure types including netlist 980. Such data structure types may reside, for example, within library elements 930 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 940, characterization data 950, verification data 960, design rules 970, and test data files 985 which may include input test patterns, output test results, and other testing information. Design process 910 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 910 without deviating from the scope and spirit of the invention. Design process 910 may also include modules for performing standard circuit design processes such as timing analysis, verification, design rule checking, place and route operations, etc.

Design process 910 employs and incorporates logic and physical design tools such as HDL compilers and simulation model build tools to process design structure 920 together with some or all of the depicted supporting data structures along with any additional mechanical design or data (if applicable), to generate a second design structure 990.

Design structure 990 resides on a storage medium or programmable gate array in a data format used for the exchange of data of mechanical devices and structures (e.g. information stored in a IGES, DXF, Parasolid XT, JT, DRG, or any other suitable format for storing or rendering such mechanical design structures). Similar to design structure 920, design structure 990 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 1-4. In one embodiment, design structure 990 may comprise a compiled, executable HDL simulation model that functionally simulates the devices shown in FIGS. 1-4.

Design structure 990 may also employ a data format used for the exchange of layout data of integrated circuits and/or symbolic data format (e.g. information stored in a GDSII (GDS2), GL1, OASIS, map files, or any other suitable format for storing such design data structures). Design structure 990 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 1-4. Design structure 990 may then proceed to a stage 995 where, for example, design structure 990: proceeds to tape-out, is released to manufacturing, is released to a mask house, is sent to another design house, is sent back to the customer, etc.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed:

1. A method implemented on a computing device, comprising generating a model of effects of metal fill in an integrated circuit using a processor, wherein the metal fill model is generated prior to completion of any layout design for the integrated circuit, wherein:
the generating the model of effects comprises:
identifying at least one sub-cell having a plurality of metal fill shapes;
modeling the at least one sub-cell in a capacitive and resistance network;
determining effects of the at least one sub-cell; and
extrapolating the model of the at least one sub-cell including the determined effects to encompass an open space between adjacent power transmission or signal lines within the integrated circuit that is to include the metal fill;
the determined effects of the at least one sub-cell include an effective capacitance of the at least one sub-cell; and
the extrapolated model provides a number of the at least one sub-cell placed within the open space between the adjacent power transmission or signal lines to provide an overall effective capacitance of the metal fill.

2. The method of claim 1, wherein the effects represented in the metal fill model include capacitance values generated by placement of the metal fill in the integrated circuit.

3. The method of claim 1, wherein the metal fill model is generated to include a resistance and capacitance network representative of the metal fill, which is used to place the metal fill in open spaces between metal lines.

4. The method of claim 1, wherein the metal fill model develops the metal fill as a library device on the effects of the metal fill in the integrated circuit.

5. The method of claim 1, wherein the metal fill model is generated from sub cells of metal fill and expanded to include the metal fill for open space between metal lines based on an effective capacitance of the sub cells of the metal fill.

6. The method of claim 1, wherein the metal fill model is created as a device with p-cell.

7. The method of claim 1, wherein the metal fill model is generated using design rules associated with fabrication processes of the integrated circuit.

8. The method of claim 7, wherein the metal fill model is generated using parameters, including at least one of:
a width separating metal lines, "w";
a length of the metal lines, "l";
spacing between the metal fill, "s";
spacing between the metal fill and an adjacent metal line, "bs" of the metal lines;
thickness of the metal fill, "t"; and
fill density, "fd".

9. The method of claim 8, wherein the spacing "s" and "bs" are minimum requirements.

10. The method of claim 1, wherein:
the at least one sub-cell comprises a first sub-cell including an effective capacitance of a row of a plurality of sub-cells and a second sub-cell including an effective capacitance of a column of a plurality of sub-cells;
the effective capacitance of the row of the plurality of sub-cells and the effective capacitance of the column of the plurality of sub-cells are modeled in the capacitive and resistance network; and
the model of the row of the plurality of sub-cells and the column of the plurality of sub-cells are extrapolated to encompass the open space between the adjacent power transmission or signal lines within the integrated circuit that is to include the metal fill.

11. The method of claim 10, wherein the metal fill and the overall effective capacitance of the metal fill are implemented as a new library element.

12. A hardware description language (HDL) design structure tangibly embodied on a computer readable storage medium, the HDL design structure comprising elements that when processed in a computer-aided design system comprising at least a hardware component generates a machine-executable representation of an integrated circuit with metal fill, wherein the HDL design structure comprises a model of effects of metal fill in an integrated circuit, wherein the metal fill model is generated prior to completion of any layout design for the integrated circuit, wherein the generating the model of effects comprises:
identifying at least one sub-cell having a plurality of metal fill shapes;
modeling the at least one sub-cell in a capacitive and resistance network;
determining effects of the at least one sub-cell; and
extrapolating the model of the at least one sub-cell including the determined effects to encompass an open space between adjacent power transmission or signal lines within the integrated circuit that is to include the metal fill;
the determined effects of the at least one sub-cell include an effective capacitance of the at least one sub-cell; and
the extrapolated model provides a number of the at least one sub-cell placed within the open space between the adjacent power transmission or signal lines to provide an overall effective capacitance of the metal fill.

13. The HDL design structure of claim 12, wherein the design structure comprises a netlist.

14. The HDL design structure of claim 12, wherein the design structure resides on storage medium as a data format used for the exchange of layout data of integrated circuits.

15. The HDL design structure of claim 12, wherein the design structure resides in a programmable gate array.

* * * * *